Patented Apr. 22, 1941

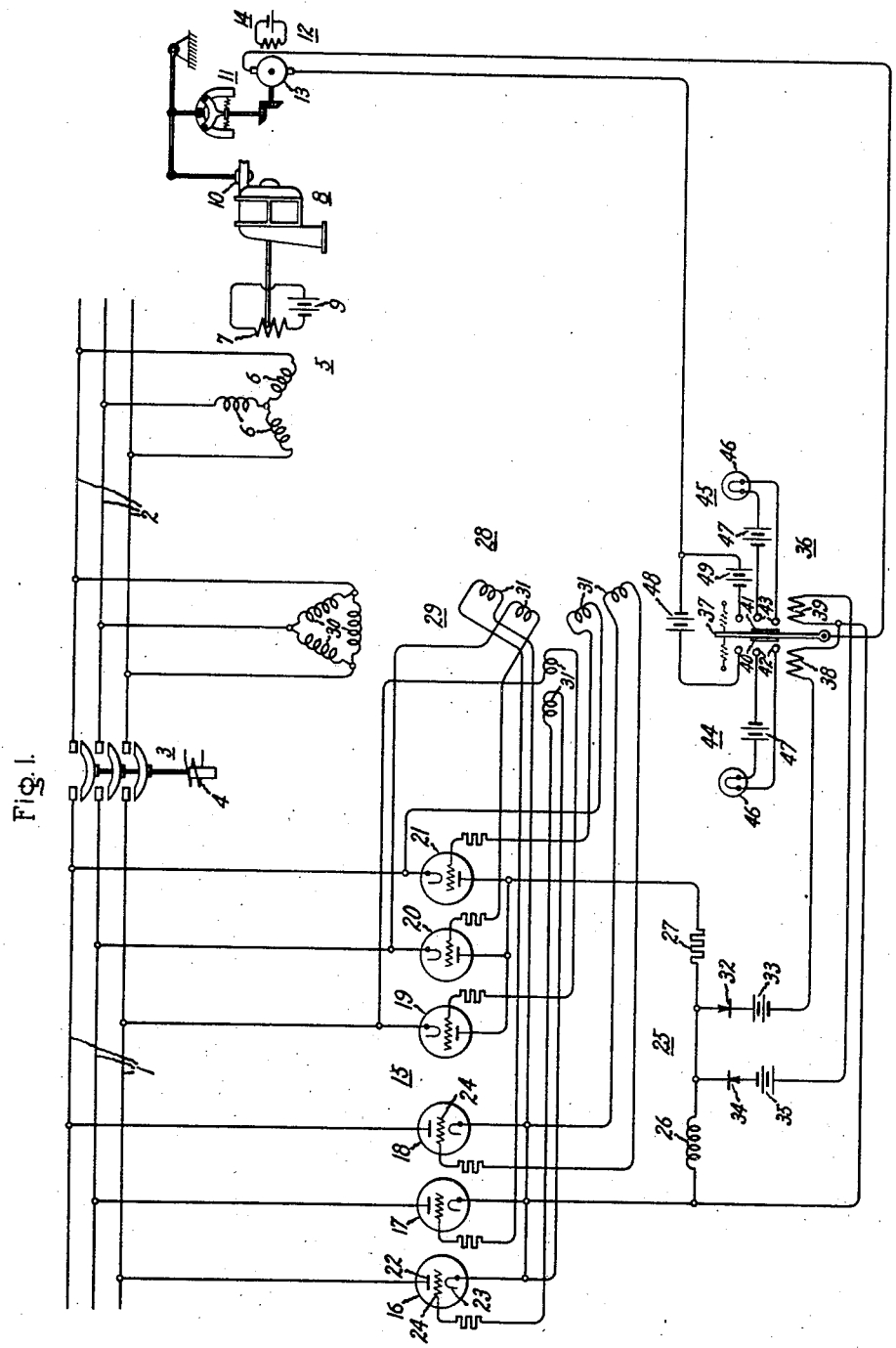

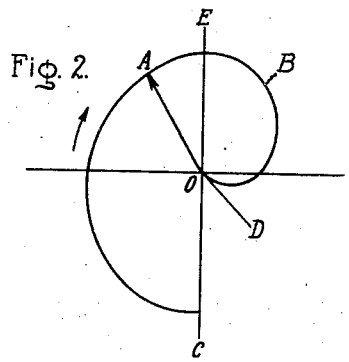
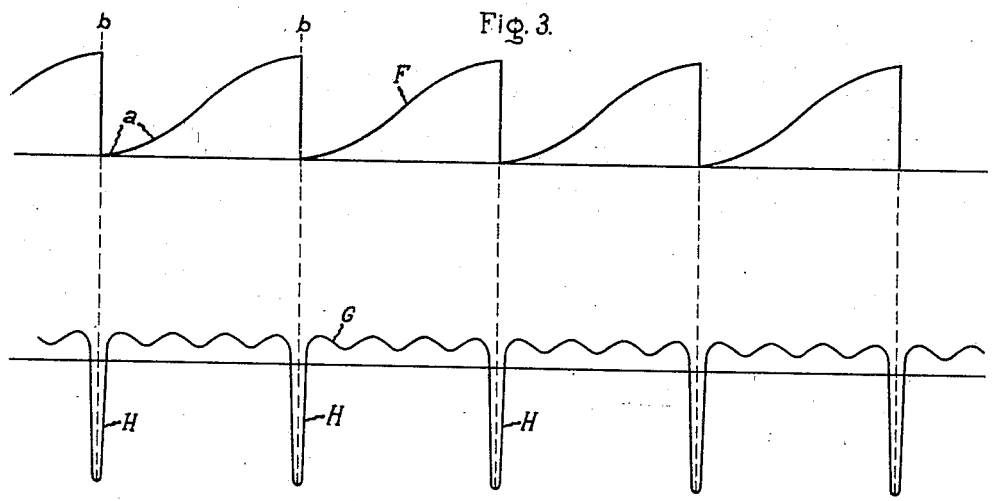
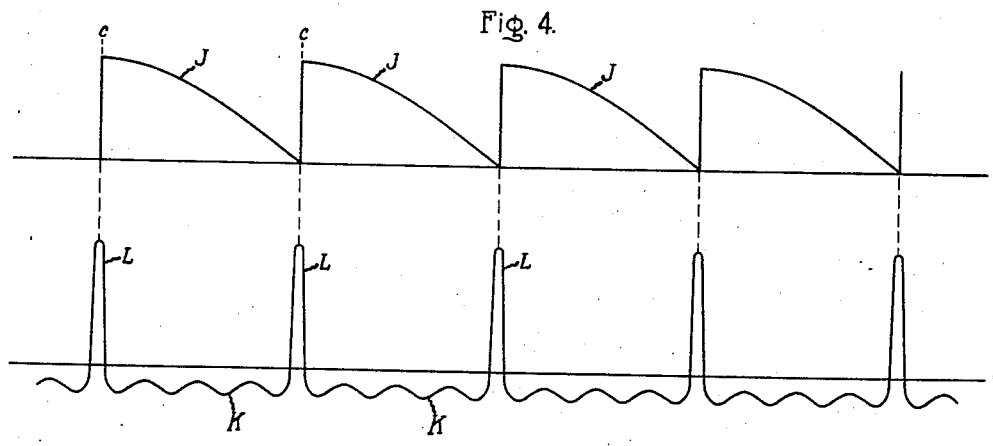

2,239,436

UNITED STATES PATENT OFFICE 2,239,436

FREQUENCY CONTROLLING SYSTEM

Ernst F. W. Alexanderson, Schenectady, N. Y., assignor to General Electric Company, a corporation of New York Application April 28, 1938, Serial No. 204,812

2 Claims. (Cl. 171—119)

My invention relates to frequency controlling systems and more particularly to electric valve systems for controlling the frequency of an alternating current circuit with respect to the frequency of another alternating current circuit, or with respect to a standard frequency.

In electric power systems, it is frequently desirable to control the frequency of an alternating current circuit to establish a coincidence of frequencies between alternating current circuits which are to be synchronized. It is desirable to provide auxiliary or control apparatus which effects this control by employing a minimum number of moving elements and which accomplishes the result in a positive and reliable manner. Heretofore many of the systems for effecting this type of control have involved relatively complicated apparatus and circuit arrangements.

It is an object of my invention to provide a new and improved system for controlling the frequency of an alternating current circuit.

It is another object of my invention to provide a new and improved electric valve circuit for controlling the frequency of an alternating current circuit with respect to a standard frequency, or with respect to the frequency of another alternating current circuit.

In accordance with the illustrated embodiment of my invention, I provide a new and improved electric valve circuit for controlling the frequency of an alternating current circuit with respect to the frequency of a second alternating current circuit and which comprises an electric valve apparatus including a plurality of electric valve means of the type employing an ionizable medium such as a gas or a vapor. Each electric valve means comprises an anode, a cathode and a control member which initiates arc discharges between the associated anode and cathode. The anode-cathode circuits of the electric valves are energized from one of the alternating current circuits, and the control members are energized in accordance with the frequency of the other alternating current circuit. An output circuit for the electric valve means is provided and includes an inductive element, the polarity of the voltage appearing thereacross varying in accordance with the difference in frequencies of the alternating current circuits. This effect is accomplished by utilizing the characteristics of the electric valves of this type by virtue of the fact that the control members are effective to initiate arc discharges between the associated anodes and cathodes but are generally ineffective in the commercial arrangements to effect deionization of the medium, deionization being effected only by reducing the potential of the anode below that of the cathode for a time equal to or greater than the time of deionization of the medium. A pair of control circuits are connected to be energized in accordance with the polarity of the voltage appearing across the terminals of the inductive element and each comprises a serially connected unidirectional conducting device and a source of unidirectional voltage, so that each circuit is responsive to one polarity of the voltage appearing across the inductance and so that only voltage impulses of that polarity above a predetermined magnitude are transmitted. Each circuit is responsive to a different polarity of the voltage appearing across the inductive element. The pair of electric circuits energizes a suitable means, such as an electro-responsive device, which controls the governor setting of a prime mover which drives an alternating current generator which is connected to the second alternating current circuit.

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to a frequency controlling system for a power generating unit; Fig. 2 is a polar diagram of the output characteristics of electric valves employing ionizable mediums; and Figs. 3 and 4 represent certain operating characteristics of the arrangement shown in Fig. 1.

Referring now to Fig. 1 of the accompanying drawings, my invention is represented as applied to a system in which it is desired to maintain a certain frequency relation between a source of standard or reference frequency, such as an alternating current circuit 1, and a second alternating current circuit 2. Circuits 1 and 2 may be arranged to be interconnected by a suitable circuit controlling means such as a circuit breaker 3 having an actuating coil 4. Circuit 2 is energized by a dynamo-electric machine, such as a synchronous alternating current generator 5, having armature windings 6 which are connected to the circuit 2 and having a field winding 7 which is driven by any suitable prime mover such as a steam turbine 8. The field winding 7 is diagrammatically shown as being energized from any suitable source of current such as a battery 9. Of course, it is to be understood that other conventional means, such as a direct current generator or a direct current generator and a sub-exciter, may be employed for this purpose. The steam turbine 8 is provided with a valve mechanism 10 which is controlled by governor mechanism 11 which controls the speed and hence the frequency of the voltage of the alternating current generator 5. The valve regulating mechanism 11 may include a controlling means, such as a direct current motor 12, having an armature member 13 and an excitation circuit 14.

To provide a voltage the polarity of which varies in accordance with the difference of the frequencies of the alternating current circuits 1 and 2, I provide an electric valve circuit 15 comprising a plurality of electric valves 16—21 which are of the type employing an ionizable medium, such as a gas or a vapor, and each of which comprises an anode 22, a cathode 23 and a control member 24 which initiates arc discharges between the associated anode and cathode. The electric valves 16—21 are arranged as a full wave rectifier to effect energization of a reactive output or load circuit 25 which comprises an inductive element or inductance 26 and a resistance 27 which is connected in series relation with the inductance 26.

I provide an excitation circuit 28 including a transformer 29 having primary windings 30 and secondary windings 31 which impress on the control members 24 of electric valves 16—21 voltages which vary in accordance with the frequency of the alternating current circuit 2. The excitation circuit 28 controls electric valves 16—21 so that the polarity of a component of voltage appearing across the terminals of the inductance 26 varies in accordance with the difference of the frequencies of the alternating current circuits 1 and 2.

A pair of polarity responsive circuits are connected to be energized in accordance with the polarity of the voltage of the inductance 26 and comprise serially connected unidirectional conducting devices and sources of unidirectional voltage of predetermined magnitude, so that each circuit is energized in accordance with a different polarity of the voltage of inductance 26 and only when the magnitude of that voltage is above a predetermined value. One circuit includes a serially connected unidirectional conducting device 32 and an opposing battery 33, and the other circuit includes a serially connected unidirectional conducting device 34 and a battery 35. The unidirectional conducting devices 32 and 34 are oppositely connected in the pair of circuits.

The pair of polarity responsive circuits are employed to control the energization of the direct current motor 12 through a suitable circuit controlling means, such as an electroresponsive device 36 having an armature member 37 which is spring biased to an intermediate position. The electroresponsive device 36 includes a pair of actuating coils 38 and 39 which are energized by the pair of polarity responsive circuits. The armature member 37 supports a pair of movable contacts 40 and 41 which engage stationary contacts 42 and 43, respectively. These latter contacts may be employed to energize indicating circuits 44 and 45, each of which includes an indicating element such as a lamp 46 and an energizing source, such as a battery 47. The electro-responsive device 36 when in the left-hand and right-hand positions is arranged to connect selectively sources 48 and 49 to the armature 13 of the direct current motor 12 to control the direction of rotation of the motor 12 and to control the setting of the governor mechanism 11.

It is to be understood that I may employ any conventional synchronizing means to effect synchronization of the alternating current circuits 1 and 2 after the frequency of the circuit 2 is substantially equal to that of circuit 1. This synchronizing apparatus may be interconnected with the arrangement shown to effect energization of the actuating coil 4 of the circuit breaker 3 at the desired time.

The operation of the embodiment of my invention shown in Fig. 1 will be explained by considering the system when it is desired to bring the frequency of the alternating current circuit 2 into substantial coincidence with that of the alternating current circuit 1. The system operates to control the governor 10 of the turbine 8 so that the frequency of the alternating current circuit 2 is equal to that of circuit 1. Electric valves 16—21 operate as a full wave rectifier to effect energization of the output or load circuit 25.

Since the anode-cathode circuits for these electric valves are energized from alternating current circuit 1 and since the control members are energized in accordance with the frequency of alternating current circuit 2, the polarity of the voltage appearing across the terminals of the inductance 26 will vary in accordance with the difference in frequencies of these circuits.

The manner in which the voltage across the terminals of inductance 26 varies in accordance with the difference in frequencies of the alternating current circuits 1 and 2 may be understood by referring to the operating characteristics shown in Fig. 2. Vector OA represents the average output voltage of an electric valve of the type employing an ionizable medium and in which the control member is effective to render the discharge device conductive and which is ineffective to render the discharge device nonconductive. Curve B is the polar diagram of the average output voltage of an electric valve of this type for various phase displacements between the anode-cathode voltage and the control member voltage, ranging from the 180° leading position, represented by line OC, to the extreme lagging position, represented by the line OD, which is substantially greater than 90 electrical degrees lagging. The arrow represents the direction of rotation of voltage of the vector OA from the 180 electrical degree leading position to the lagging position. It will be observed that as the voltage impressed on the control member of an electric valve of this type is retarded in phase with respect to the applied anode-cathode voltage, the conductivity of the electric valve remains substantially constant during the interval from the 180° leading position to the in-phase position represented by line OE; however, as the control member voltage is retarded still further, the conductivity of the electric valves decreases, as represented by the portion of the curve B lying between OE and OD. It is to be noted that the conductivity of the electric valves is abruptly controlled at the 180 electrical degree leading position, and it is smoothly controlled at the extreme lagging position.

Curve F of Fig. 3 represents the output voltage of the electric valves 16—21 when the frequency of the alternating current circuit 2 is greater than that of circuit 1. Under this condition of operation, the conductivity of the electric valves is controlled smoothly at the beginning of the waves, as illustrated in position a of curve F and is controlled abruptly at points b. This characteristic is due to the fact that under these conditions the control member voltage is advancing relative to the anode-cathode voltage from a position corresponding to the line OD to the position represented by the line OC. Curve G represents the voltage appearing across the terminals of the inductance 26. It will be noted that the output voltage includes components represented by the peaks H which are caused by the high rate of change of current through the inductance 26 at times corresponding to points b. The number of small undulations appearing between adjacent peaks depends upon the difference in the frequencies of circuits 1 and 2. When the frequency of alternating current circuit 2 is greater than that of circuit 1, coil 39 of the electro-responsive device 36 will be energized through the polarity responsive circuit including unidirectional conducting device 34 and battery 35. Armature member 37 will be moved to the right-hand position, effecting connection of battery 49 to armature 13 of the motor 12, controlling the valve mechanism 11 so that less energy is transmitted to the prime mover 8 tending to control the speed of the prime mover and hence reduce the frequency of the alternating current circuit 2. Of course, lamp 46 of circuit 45 will be energized, indicating that the frequency of circuit 2 is greater than that of circuit 1.

If the frequency of circuit 2 is less than that of circuit 1, the output voltage of the electric valves 16—21 will be of a wave form corresponding to that represented by curve J. Under this condition of operation, the abrupt changes occur at points c since the anode-cathode voltage of these valves is now rotating at a rate greater than that of the voltage impressed on the control members 24. It will be noted that under this condition of operation the abrupt part of the voltage wave occurs at the beginning of the wave; that is, there is an abrupt increase in voltage, whereas, under the conditions of operation represented in Fig. 3, the voltage is abruptly decreased. Curve K represents the voltage appearing across the terminals of the inductance 26 when the voltage of circuit 2 is less than that of circuit 1 and the peaks L represent the component of voltage due to the abrupt change in current flowing through the inductance. It will be observed that the polarities of the peaks are opposite so that the polarity selector circuit including unidirectional conducting device 32 and the battery 33 is selectively energized. Actuating coil 38 of the electroresponsive device 36 will be energized to move the armature 37 to the left-hand position, connecting battery 48 to the armature 13 of direct current motor 12 and thereby increasing the energy transmitted to the prime mover and increasing the frequency of the alternating current circuit 2.

In this manner, it will be understood that the system controls the setting of the regulating mechanism 11 in accordance with the difference in frequencies of the alternating current circuits 1 and 2, so that the frequencies are maintained at the same value. When the predetermined frequency relation is maintained, the armature member 37 of the electroresponsive device 36 is maintained in the intermediate position so that the setting of the governor mechanism is not changed.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a second alternating current circuit, and a system for controlling the frequency of said second alternating current circuit comprising an electric valve means connected to the first mentioned alternating current circuit and comprising a plurality of arc discharge paths each being of the type employing an ionizable medium and each having an anode and a control member for initiating arc discharges, the anode-cathode circuits of said electric valve means being energized at a frequency determined by the frequency of the first mentioned alternating current circuit, means for impressing on the control members voltages which vary in accordance with the frequency of said second alternating current circuit, an output circuit for said electric valve means including an inductive element, the polarity of the voltage across said inductive element varying in accordance with the difference in the frequencies of the alternating current circuits, a pair of circuits energized in accordance with the voltage appearing across said inductive element and each comprising a unidirectional conducting device for energizing the respective associated circuit in accordance with the polarity of the voltage appearing across said inductive element and an electroresponsive device controlled by said pair of circuits.

2. In combination, a polyphase alternating current circuit, a second polyphase alternating current circuit, a group of electric valve means of the gaseous type corresponding in number to the number of phases of the first mentioned alternating current circuit and each having an anode, a cathode and a control member, the cathodes being connected together, a second group of electric valve means of the gaseous type corresponding in number to the number of phases of said first mentioned alternating current circuit and connected to said first mentioned alternating current circuit and each having an anode, a cathode and a control member, the anodes of the electric valves in said second group being connected together, the anode-cathode circuits of the electric valve means in the first mentioned and the second mentioned groups being energized at a frequency being determined by the first mentioned polyphase alternating current circuit, means for impressing on the control members of said electric valves in said first mentioned and said second mentioned groups alternating voltages which vary as the frequency of said second mentioned circuit, a control circuit connected between the cathodes of the electric valves of said first mentioned group and the anodes of the second group and comprising an inductance, means for controlling the frequency of said second circuit, and polarity responsive means connected across said inductance to control the frequency controlling means.

ERNST F. W. ALEXANDERSON.